April 16, 1957  J. W. JACOBS  2,788,812
ADJUSTABLE MULTI-BLADE DADO CUTTER
Filed May 24, 1955  3 Sheets-Sheet 1

JOHN W. JACOBS
INVENTOR.

BY
Smith & Tuck

JOHN W. JACOBS
*INVENTOR.*

BY
*Smith & Tuck*

United States Patent Office 2,788,812
Patented Apr. 16, 1957

2,788,812

ADJUSTABLE MULTI-BLADE DADO CUTTER

John W. Jacobs, Seattle, Wash.

Application May 24, 1955, Serial No. 510,693

7 Claims. (Cl. 144—237)

This present invention relates to the general art of circular saws, and, more particularly, to a dado cutting arrangement comprising a plurality of circular cutting members or saws. A special adjusting means is provided whereby on the turning of a single rotary element the three saws comprising the preferred arrangement are moved equidistant from each other. Means are also provided for insuring the accurate overlap of the teeth so that they will be spaced in a manner permitting the saw blades to be brought in close engagement with each other with the full assurance that the extended tooth or cutting portions of the saw will not interfere with each other.

In the past many devices have been made for making dado cuts or grooves. Dado grooves are normally of considerable width so that the ends of boards or the like can be set into the same. As a result of the appreciable width, it has never been practical to make the same with a single saw because the chips produced in the passage of the saw would have too great a length to be free cutting, resulting in torn edges or faces of the groove. Therefore, it has become quite common to employ a group of saws on a single mandrel with their teeth angularly displaced so that, in effect, a series of merging cuts is made so that the chips themselves become short in length and thus are cut cleanly by the saws. The most generally accepted or approved form of saw arrangement is to employ the plurality of saws, although there have been many instances of employing a wobbling mount for a single saw to the end that it will, because of the relatively high speed of the saw, actually cover, progressively, a considerable width. It appears, however, that for neat, accurate and quickly achieved work the multi-saw arrangement is to be preferred, and this present invention embodies this general principle. Skilled workmen in the past have had no great difficulty in placing a number of saws on a mandrel and using spacers and the like to space them apart in the proper cutting sequence, but the time required for making a set-up of this order has always been considerable and it requires a skilled operator to produce uniform work. In this present invention it is believed that a very worthwhile addition has been made to the knowledge in this field by providing a single knurled nut or sleeve which may be located so as to move the plurality of saws an equal amount along their axis of rotation, to the end that they will each have a proper overlap and the disposal of the chips and the like will be greatly simplified. It has also been necessary in the past for a skilled workman to space the actual cutting edges of the saw teeth angularly with respect to the other saws of the group, to the end that only one saw tooth will bite into a single line of grain at one time in order that small chips will be produced. In the past this was normally achieved by unloosening the locking means which normally holds the saws against angular displacement one with the other, and to then manually adjust the various saws of the group to give the uniform spacing of the teeth. In this present invention means are provided for insuring that the teeth of the saws will always be maintained in the spacing set at the factory or at the grinding shop where the saws may be, to a degree, reworked during the sharpening processes.

The principal object of my present invention, therefore, is to provide a dado cutter formed of a plurality of circular saws so mounted that the rotation of a single adjusting element will move the various saws together or apart from each other and at all times maintain an equal spacing between them.

A further object of this invention is to provide means whereby the preferred spacing of the teeth on the various saws, with respect to each other, will be maintained throughout the life of the saws.

A further object of this invention is to provide a dado saw adjusting means which makes it possible for persons of limited skill to accurately adjust the saws to give the dado cut desired.

A further object of this invention is to provide a dado cutter that is characterized by a rigidity in its locked position which will insure the very highest character of work from this equipment.

Further objects, advantages and capabilities will be apparent from the description and disclosure in the drawings, or may be comprehended or are inherent in the device.

Figure 1:
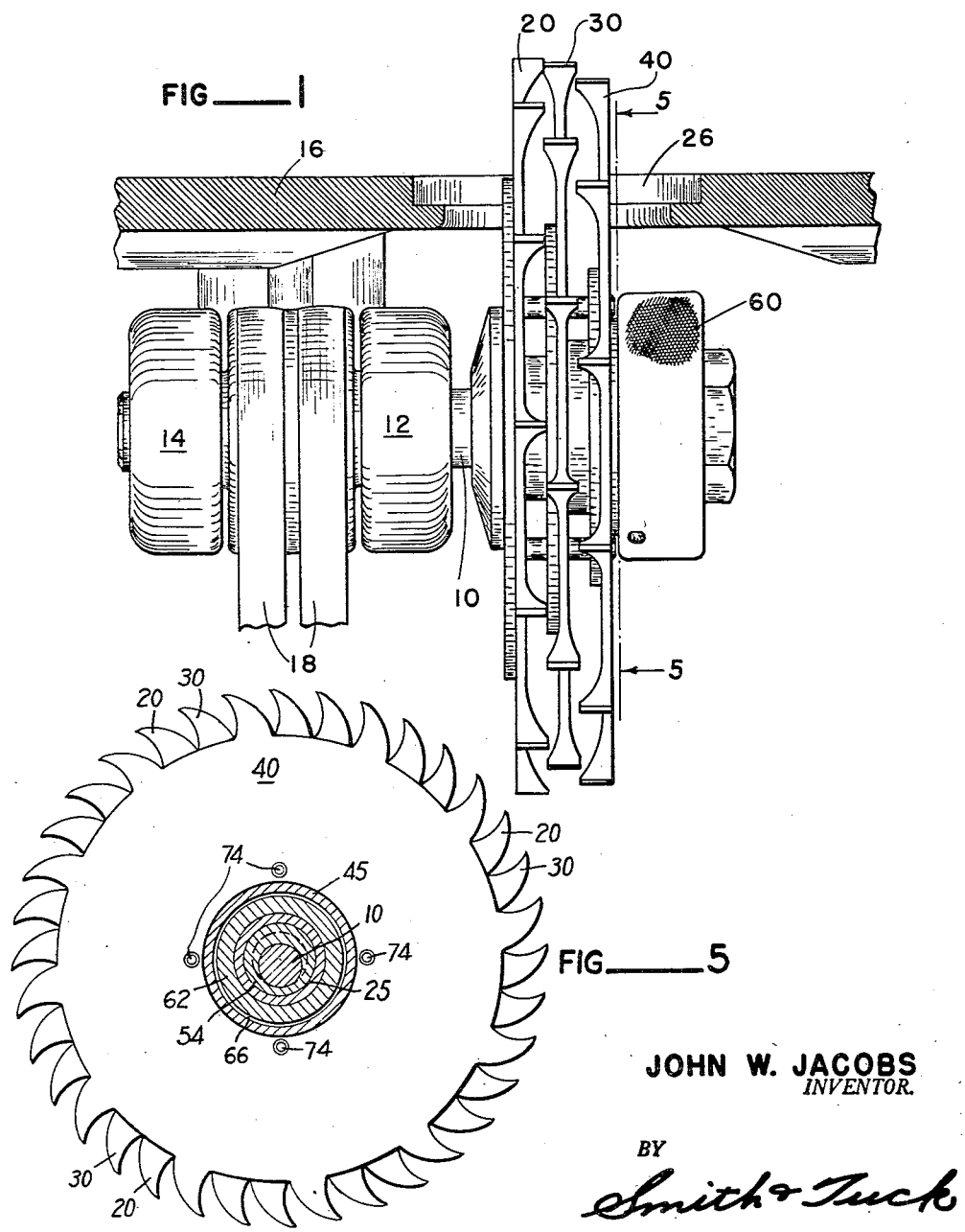
Figure 1 is a vertical sectional view through a saw table and illustrating the manner in which this present dado saw arrangement is operatively positioned for rotation and the drive means associated therewith.
Figure 2:
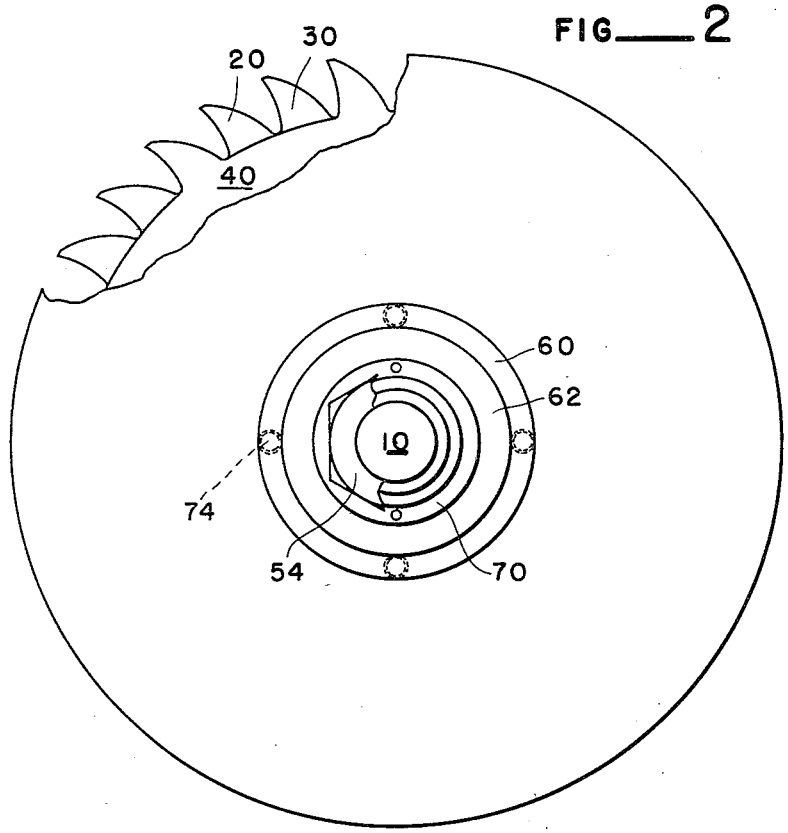
Figure 2 is an end view taken along the axis of rotation of my dado saw arrangement with certain parts broken away to better illustrate the construction.

Referring more particularly to the disclosure in the drawings, the numeral 10 designates the saw mandrel upon which this dado saw is operatively mounted. In Figure 1 it will be noted that mandrel 10 is mounted for rotation within two spaced, preferably anti-friction bearings, as 12 and 14. These bearings are in turn suitably supported below the saw table proper, 16. Power to drive mandrel 10 will be applied in any suitable manner as by means of a twin flexible belt drive indicated at 18. The individual saws, as 20, 30 and 40, are all of the same diameter and extend up above the upper surface of saw table 16 through a counter-bored opening 26. It is quite often desirable to employ inset shield means in counterbore 26, but as this is quite common in this field of endeavor, the same has not been illustrated in the accompanying drawings.

A saw backing flange 50 is provided which is suitably secured to or formed as part of mandrel 10. The saw receiving end of mandrel 10 is threaded as at 52 so that a lock nut, as 54, may be employed to lock the saws in their adjusted position against flange 50.

Each of the saws, as 20, 30 and 40, is provided with saw carriers. These are designated as carriers 22, 32 and 42. These various saw carriers have certain properties in common. They are each provided with a circular flange which is formed as a unit with a hub portion, as 25, 35 and 45. Each of the saw carrier flanges is in turn provided with an annular, outstanding rib, as 27 and 37, except that flange 42, which supports saw 40, does not have this annular ridge but relies upon the hub portion 45 as a centering means for saw 40. It is very desirable that all the saws be accurately held in axial alignment. A preferred way of achieving this end result is to, first of all, have saw 20 seat on the outer surface of rib 27, which is a portion of flange 22, and this in turn is definitely positioned in a concentric manner around the axis of mandrel 10 by means of the generously proportioned hub 25. Saw 30 is seated on the outer surface of the annular rib 37, and flange 32, of which it is a part, is seated on a very accurately machined portion 38, which rests upon, preferably, the ground outer surface of hub 25. Saw 40 seats on hub 45, but this hub in turn has a carefully machined portion at 48, which seats on the accurately machined outer surface of hub 35. It is desirable to bring out clearly that reliance is not left to the seating of flanges 32 and 42 on the interior threads of their respective hub members, but surfaces, as noted, which are preferably interiorly ground, seat on exteriorly ground surfaces so that firm abutments are obtained clear into mandrel 10, and in this way the high speed saws will be held concentrically with the axis of rotation, which in itself is very desirable as a matter of balancing these high speed saws, and, secondly, the bottom of the dado cut will be a smooth one with no showing of any differences in depth which would be occasioned if the saws were not all definitely concentric to their common axis of rotation.

Figures 3, 4:
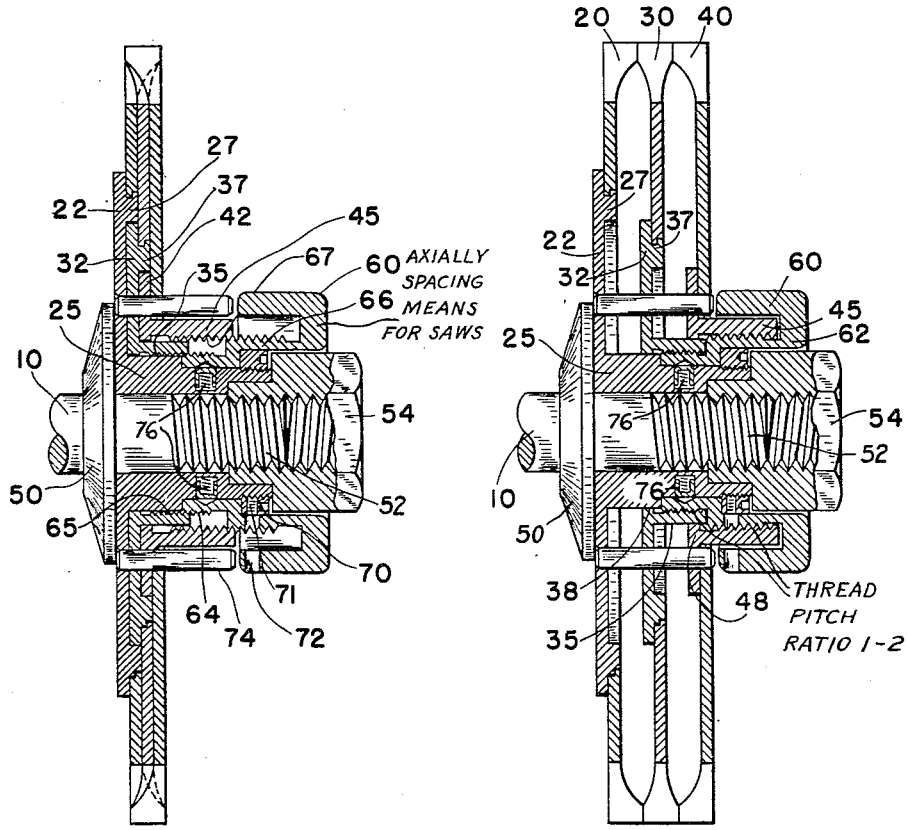
Figure 3 is a vertical sectional view taken along the axis of rotation of this saw unit and showing the saws in their closest or thinnest nut adjusted position.
Figure 4 is a view similar to Figure 3, but illustrating the saws in their most fully extended position.

When the dado saw equipment is initially set up and the three saws put in place, the principal or interior hub 25 is locked in position against flange 50 by lock nut 54. Exteriorly of lock nut 54 is the adjusting sleeve 60. This sleeve is preferably made as a part of hub member 62. It will be noted, particularly in Figures 3 and 4, that hub member 62 is threaded on two different diameters. One of the inner diameters, as 64, is threaded with a relatively fine thread to operatively engage the interiorly threaded portion 65 of hub 35. On an increased diameter, hub 62 is exteriorly threaded, as at 66, to operatively engage the interior threaded portion 67 of hub 45. The exact pitch is relatively unimportant, but it is essential for the workability of this unit that threads 64 be so proportioned to threads 66 that saw 40 will be moved twice as far as saw 30 is moved for any given revolution of the adjusting sleeve 60. One solution to this problem would be to make threads 66 twice as large as threads 64, or they might be the same pitched threads with the threading on portion 66 being double threaded, or having two threads cut on it starting at diametrically opposite points. It has been found desirable to knurl or otherwise configure the outer surface of sleeve 60 as a convenience for turning the same during the adjusting period. The adjusting sleeve assembly consisting of the adjusting sleeve 60 and the hub portion 62 is held in position against longitudinal movement along mandrel 10 by virtue of being recessed into hub 25 and then being provided with a threaded locking collar 70, which collar in turn is secured in fixed relationship as by the set screw 71. A set screw adjusting opening is provided at 72 to facilitate the proper setting of this positioning collar. The adjusting sleeve assembly 60 is held with the desired frictional resistance by the pressure means indicated at 76. These may be spring detents or any other suitable resilient means.

In order to insure that the various saws, as 20, 30 and 40, will be maintained in proper angular relationship at all times, a plurality of angular positioning pins 74 are employed. These pins pass through the three saw supporting carrier flanges, as 22, 32 and 42. The pins are not locked in place, but are rather held in position by flange 50 and the adjusting sleeve 60, as will be apparent from a study of Figures 3 and 4.

It is believed that it will be clearly apparent from the above description and the disclosure in the drawings that the invention comprehends a novel construction of an adjustable multi-blade dado cutter.

Having thus disclosed my invention, I claim:

1. An adjustable multi-blade dado cutter, comprising: a power driven saw mandrel having a saw receiving bearing defined thereon by an annular saw backing flange and a threaded end bearing a lock nut, first, second and third circular saws spaced evenly apart and first, second and third saw carriers each including an annular flange and an inner hub and means securing each saw to the flange of its carrier in concentric position relative to the carrier hub and each hub being positioned concentric with the axis of rotation of the mandrel, the hubs having different inner diameters with the first hub fitting the mandrel in abutment to the saw backing flange, with the second hub fitting an outer bearing portion on the first hub, and with the third hub fitting an outer bearing portion on the second hub, an adjusting sleeve positioned concentric with the axis of rotation of the mandrel and means securing the adjusting sleeve from movement longitudinally of the mandrel and of the first hub, and said adjusting sleeve having threaded connection with the second and third carriers, the second carrier being positioned between said first and third carriers and the threaded engagement with the adjusting sleeve moving the second carrier axially of the mandrel half the distance that the third carrier is moved by its threaded engagement with the adjusting sleeve upon rotation of the adjusting sleeve, whereby upon manual rotation of the adjusting sleeve the even axial spacing of the saws is maintained.

2. The subject matter of claim 1 in which there are means securing together the carriers against relative rotary movement about the axis of rotation of the mandrel comprising: a plurality of pins parallel to the mandrel and aligned openings in the carriers in which the pins are positioned, whereby when the saws are secured to their carriers in staggered relation, the teeth of the different saws engage the workpiece successively, and this spacing is maintained, since relative rotary movement of the carriers is precluded.

3. An adjustable multi-blade dado cutter, comprising: a power driven saw mandrel having a saw receiving bearing defined thereon, first, second and third circular saws spaced evenly apart and first, second and third saw carriers each including an inner hub and means securing each saw to its carrier in concentric position relative the carrier hub and each hub being positioned concentric with the axis of rotation of the mandrel, the hubs having different inner diameters with the first hub fitting the mandrel, with the second hub fitting an outer bearing portion on the first hub, and with the third hub fitting an outer bearing portion on the second hub, an adjusting sleeve positioned concentric with the axis of rotation of the mandrel and means securing the adjusting sleeve from movement longitudinally of the mandrel and of the first hub, and said adjusting sleeve having threaded connections with the second and third carriers, the second carrier being positioned between said first and third carriers and the threaded engagement with the adjusting sleeve moving the second carrier axially of the mandrel half the distance that the third carrier is moved by its threaded engagement with the adjusting sleeve upon rotation of the adjusting sleeve, whereby on manual rotation of the adjusting sleeve the even axial spacing of the saws is maintained.

4. The subject matter of claim 3 in which the saw teeth on the saws are secured to their carriers in staggered relation, whereby the teeth of the different saws engage the workpiece successively, and this spacing is maintained by means securing together the carriers against relative rotary movement about the axis of rotation of the mandrel, whereby the disposition of the saw teeth is not disturbed relative rotary movement of the carriers.

5. An adjustable multi-blade cutter, comprising: a power driven saw mandrel having a saw receiving bearing defined thereon; first, second and third circular saws spaced evenly apart and first, second and third saw carriers each including an inner hub and means securing each saw to its carrier in concentric position relative the carrier hub and each hub being positioned concentric with the axis of rotation of the mandrel, threaded means connecting together said carriers and manually operable to move said carriers toward and away from each other while preserving their even spacing and the carriers and hubs being interfitting so that portion of adjacent carriers fit within each other when the saws are adjusted to a minimum spacing through said threaded means, the saws being secured to their carriers in staggered relation, whereby the teeth of the different saws engage the workpiece successively, and this spacing is maintained by means securing together the carriers against relative rotary movement about the axis of rotation of the mandrel, whereby the disposition of the saw teeth is not disturbed by relative rotary movement of the carriers.

6. An adjustable multi-blade cutter, comprising: a power driven saw mandrel having a saw receiving bearing defined thereon; first, second and third circular saws spaced evenly so as to position their teeth to make a proper cut and first, second and third saw carriers each including an inner hub and means securing each saw to its carrier in concentric position relative the carrier hub and each hub being positioned concentric with the axis of rotation of the mandrel, portions of the saw teeth on adjacent saws interfitting in close spacing of the saws whereby the saws are secured to their carriers in staggered relation, whereby the teeth of the different saws engage the workpiece successively, and this spacing is maintained by means securing together the carriers against relative rotary movement about the axis of rotation of the mandrel whereby the disposition of the saw teeth is not disturbed by relative rotary movement of the carriers; and threaded means connecting together said carriers and manually operable to move said carriers toward and away from each other while preserving their even spacing.

7. An adjustable multi-blade cutter, comprising: a power driven saw mandrel having a saw receiving bearing defined thereon; first, second and third circular saws spaced evenly so as to position their teeth to make a proper cut and first, second and third saw carriers each including an inner hub and means securing each saw to its carrier in concentric position relative the carrier hub and each hub being positioned concentric with the axis of rotation of the mandrel; and threaded means connecting together said carriers and manually operable to move said carriers toward and away from each other while preserving their even spacing.

References Cited in the file of this patent

UNITED STATES PATENTS

| | | |
|---|---|---|
| 161,287 | Slayton | Mar. 23, 1875 |
| 384,248 | Fox | June 12, 1888 |
| 394,175 | Grzybowski | Dec. 11, 1888 |
| 432,824 | Fox | July 22, 1890 |
| 1,075,907 | Dunton | Oct. 14, 1913 |
| 1,218,836 | Carman | Mar. 13, 1917 |
| 2,349,949 | Farrell | May 30, 1944 |
| 2,556,024 | Bourdon et al. | June 5, 1951 |